United States Patent [19]

Kerby

[11] Patent Number: 4,993,578
[45] Date of Patent: Feb. 19, 1991

[54] LATERAL IMPACT REACTIVE FUEL TANK CAP

[75] Inventor: Keith A. Kerby, Clarkston, Mich.
[73] Assignee: Chrysler Corporation, Highland Park, Mich.
[21] Appl. No.: 526,279
[22] Filed: May 21, 1990
[51] Int. Cl.⁵ .................................. B65D 41/34
[52] U.S. Cl. ......................... 220/258; 220/DIG. 33
[58] Field of Search ............. 220/258, 254, 255, 85 F, 220/DIG. 33, 288

[56] References Cited

U.S. PATENT DOCUMENTS

| | | | |
|---|---|---|---|
| 4,142,756 | 3/1979 | Henning et al. | 220/DIG. 33 X |
| 4,177,931 | 12/1979 | Evans | |
| 4,228,915 | 10/1980 | Hooper et al. | 220/DIG. 33 X |
| 4,494,673 | 1/1985 | Hiraishi | 220/DIG. 33 X |
| 4,610,284 | 9/1986 | Bartholomew | |
| 4,678,097 | 7/1987 | Crute | 220/DIG. 33 X |
| 4,768,677 | 9/1988 | Kitsukawa | 220/DIG. 33 X |
| 4,854,471 | 8/1989 | Kasugai et al. | 220/DIG. 33 X |

Primary Examiner—Stephen Marcus
Assistant Examiner—Vanessa M. Roberts
Attorney, Agent, or Firm—Kenneth H. MacLean, Jr.

[57] ABSTRACT

For the inlet of a vehicle fuel tank, an improved cap having an outer gripping portion and an inner body portion for threading into tank's inlet. The inner and outer portions are connected by several axially extending, thin posts so that when the outer portion is impacted, axially or laterally, the portions are severed by breakage of the posts.

6 Claims, 2 Drawing Sheets

LATERAL IMPACT REACTIVE FUEL TANK CAP

BACKGROUND OF THE INVENTION

1. Field of the Invention

This application concerns a vehicle fuel tank and inletting apparatus with a cap including an externally exposed gripping portion for rotation of an interior body portion within the inlet. The gripping portion is attached to the body portion by a plurality of frangible connectors which are sufficiently strong to transmit torque forces between the gripping portions and the body portion but readily break when the gripping portion is subjected to a substantial lateral impact, leaving the body portion in the filler inlet to plug the opening.

2. Description of Related Art

Vehicle fuel tank and inletting structure should include a cap to seal the inlet and include a convenient external gripping portion so that a user can easily remove and install the cap. The cap should also be constructed so that the external portions of the cap will separate when impacted leaving a main body portion of the cap in the inlet to plug the opening.

There have been earlier attempts to design a cap for fuel inlets which include a capacity to allow external portions of the cap to break away when impacted. U.S. Pat. No. 4,177,931 to Evans discloses a vehicle filler device with an external portion of a cap designed to break away from an internal portion. Specifically, grooved connecting portions are formed so that when an axial impact or force is imposed on the cap, the external portion breaks away. Evans is not very well designed to produce the same result when the external portions of the cap are laterally or side impacted.

The U.S. Pat. No. 4,610,284 to Bartholomew discloses a filler inlet design to permit breakage of the inlet from its attachment to the vehicle when impacted in the axial direction. Again, grooves are formed in a flange to weaken the structure and facilitate fracture. No details on an appropriate cap for the inlet are disclosed.

SUMMARY OF THE INVENTION

This application discloses a vehicle inlet and closure structure for a vehicle fuel tank adapted to shed an exterior portion of a fuel cap when impacted either axially or laterally, leaving a body portion of the cap in the inlet plugging the opening.

The subject improved fuel cap has an external gripping portion for permitting a user to easily rotate the cap during removal or installation. The cap also has an interior body portion threadably engaging the inlet to plug or close the inlet when the cap is installed. The gripping portion is attached to the body portion by a number of thin posts. The posts are separated one from another and extend in an axial direction so that when the gripping portion is impacted axially, the posts buckle, allowing the gripping portion to separate from the body portion. Likewise, when the gripping portion is impacted laterally (from the side or radially), the posts break allowing the gripping portion to separate from the body portion. Naturally, when the impact force is a combination of axial and lateral forces, the posts act predictably and break as desired.

Therefore, an object of this invention is to provide an inletting structure for a vehicle fuel tank with an improved cap designed so that external and internal portions are severable by lateral as well as axial forces.

A further object of the subject inletting structure for a vehicle fuel tank is to provide an improved cap structure having an external gripping portion and an internal body portion which plugs the inlet. The portions of the improved cap are connected by several axially extending and thin posts adapted to break when the outer gripping portion is impacted, axially or laterally.

Further objects and advantages of the subject improved inlet and cap will become more readily apparent after a reading of the following detailed description of an embodiment, reference being had to the drawings which illustrate the embodiment.

IN THE DRAWING

Figure 2:
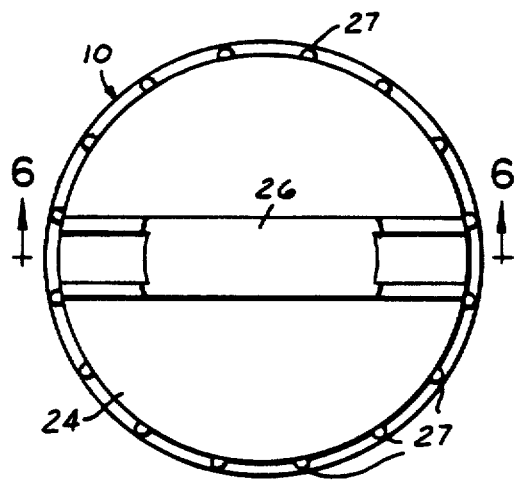
FIG. 2 is a planar top view of the fuel tank inlet cap.
Figure 3:
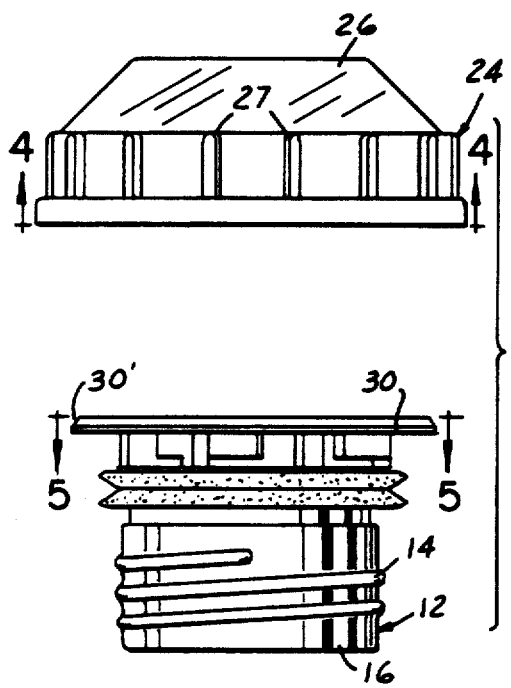
Figure 4:
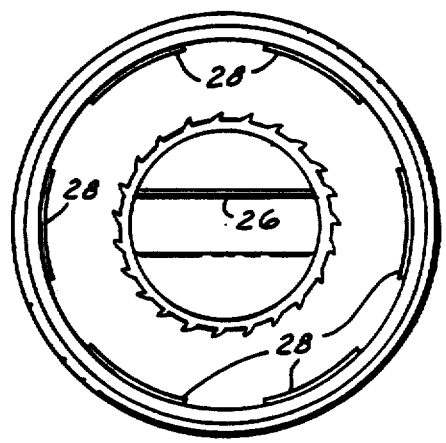
Figure 5:
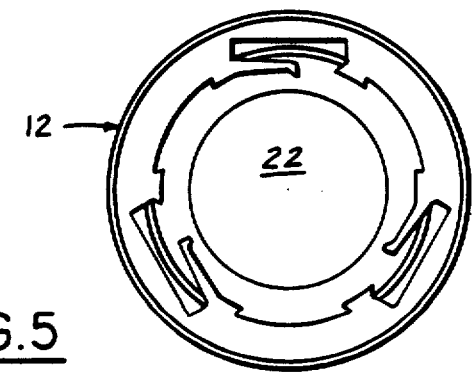
Figure 6:
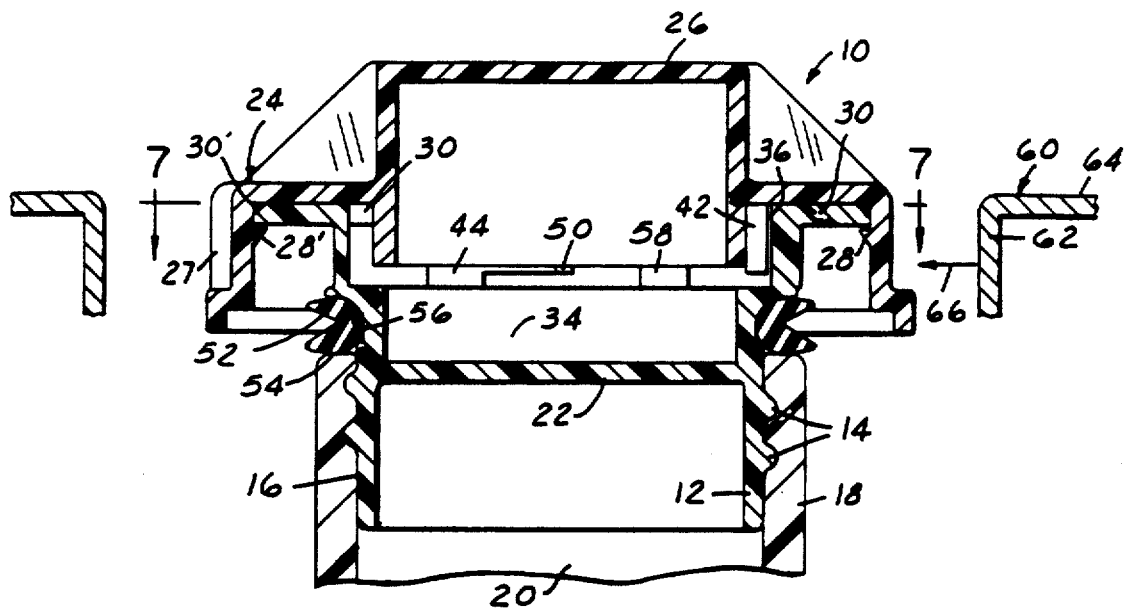
Figure 7:
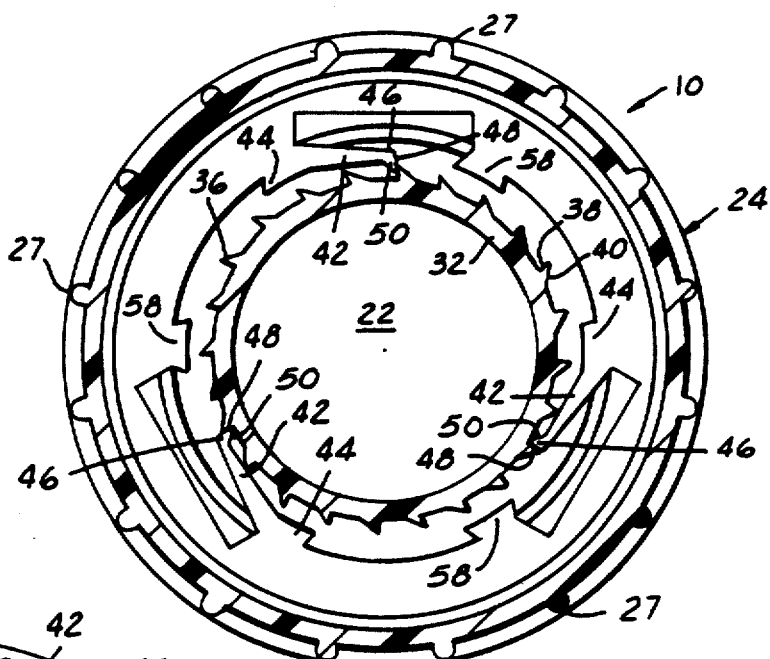
Figure 8:
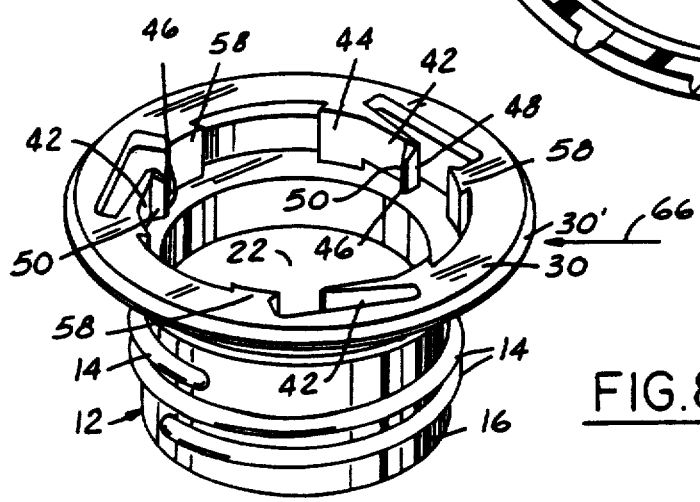

FIG. 3 is an elevational side view of the ca with an outer grip portion separated from the threaded body portion to better reveal connecting structure; and FIG. 4 is planar bottom view of the outer grip portion of the cap taken along line 4—4 in FIG. 3 and looking in the direction of the arrows; and FIG. 5 is an elevational top view of the threaded body portion of the cap taken along line 5—5 in FIG. 3 and looking in the direction of the arrows; and FIG. 6 is an elevational sectioned view of the cap taken along section line 6—6 in FIG. 2 looking in the direction of the arrows and including a sectioned and partial view of typical fuel tank inlet; and FIG. 7 is a planar sectioned view of the cap taken along section line 7—7 in FIG. 6 and looking in the direction of the arrows; and FIG. 8 is perspective view of the threaded portion of the cap showing the upper interconnecting portion which engage the outer grip portion.

DETAILED DESCRIPTION OF A PREFERRED EMBODIMENT

Figure 1:
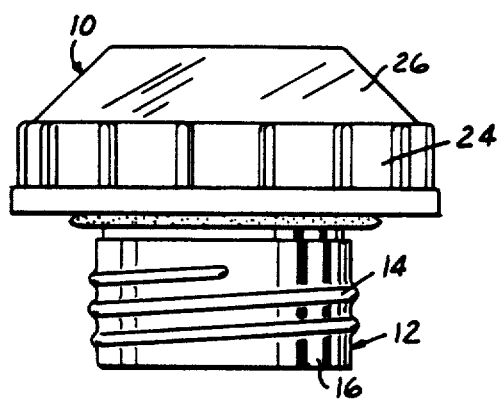
FIG. 1 is an elevational side view of a vehicle fuel tank closure or cap.

In FIGS. 1-3, the subject improved closure cap 10 for a vehicle fuel tank is illustrated. The closure cap 10 includes a generally cylindrical and tubular body portion 12 with a helical thread means 14 formed on its cylindrical outer surface 16. The threaded surface 14 is adapted to engage a similarly threaded fuel tank inlet 18 as shown in FIG. 6. The fuel tank inlet has a interior 20 extending to the interior of the associated fuel tank. It is of the type shown in the earlier identified Teets Paten Application and is of molded plastic construction. The tubular body portion 12 includes a molded partition wall 22 which separates the interior 20 of the fuel tank inlet from the atmosphere when the cap 10 is threaded into the inlet 16 as best seen in FIG. 6.

The cap 10 also includes an upper manual gripping portion 24 connected to the lower tubular body portion 12. The gripping portion 24 has a raised rib 26 molded therewith which extends radially thereacross. The rib 26 permits a user to more easily grip the cap and to rotate it relative to the inlet 16. Likewise, a plurality of radially outward projecting nibs 27 are formed on the gripping portion so that it can be more easily grasped.

As best seen in FIG. 6, the lower body portion 12 is attached to the upper gripping portion 24 by the snap fit interaction of tabs 28 on the gripping portion 24 and an annular edge 30 of the body portion 12. Specifically, there are a plurality of circumferentially spaced tabs 28 as seen in FIG. 4. The tabs 28 have an oblique surface 28' and the edge 30 has a complementary oblique surface 30' to facilitate the snap fitting of the tabs and edge 28, 30. Thus when the gripping portion 24 is brought together (moved downwardly in FIG. 3) with the body portion 12, the surfaces 28' and 30' allow the edge 30 to move past the tabs 28. The portions 12 and 24 are thus attached together.

The attachment of the body portion 12 and the gripping portion 24 so far described permits relative rotation between the two portions. This rotation is controlled by an interconnecting structure of the body 12 and gripping portion 24. Specifically, as best seen in FIGS. 6 and 7, the gripping portion 24 has a central cylindrical formation 32 which extends downwardly into the upper interior space 34 defined by body 12 and partition wall 22. The formation 32 has a plurality of circumferentially spaced and radially outwardly projecting teeth 36 formed thereon. As seen in FIG. 7, the teeth 36 have a generally radially extending surface 38 and an inclined surface 40.

Three flexible arms 42 which are integrally molded with body portion 12 are designed to interact with the surfaces 38 and 40 of teeth 36 so that relative rotative movement between the portions 12 and 24 are controlled. Specifically, the arms 42 generally extend in a clockwise circumferential direction from a relatively thin support post 44 as best seen in FIGS. 6, 7 and 8. The arms 42 have an end portion 46 which defines a generally radially directed surface 48. The surfaces 38 of the gripping portion 24, specifically formation 32, engages the surfaces 48 of the arms 42 when the gripping portion 24 (formation 32 in FIG. 7) is rotated counterclockwise to remove threaded body 12 from inlet 18 for exposing the inlet for filling the fuel tank. The very positive interaction of the generally radially directed surfaces 38 and 48 produce a significant torque transfer from the gripping portion 24 to the body portion so that the cap 10 can be removed from the filler inlet.

When it is desired to thread the cap 10 into the inlet 12 so that the fuel tank is separated from the atmosphere, the gripping portion 24 and formation 32 thereof is rotated clockwise in FIG. 7 relative to the body portion 12. This engages the inclined surfaces 40 of the teeth with inclined surfaces 50 formed on ends 46 of arms 42. This interaction between the inclined surfaces 40 and 50 allows the ends 46 of the flexible arms 42 to move radially outward in response to a large force imposed on the arms 42 by the teeth 36 in installing the cap 10 in inlet 18. Thus, the interaction between the inclined surfaces 40 and 50 limits the torque exchange from formation 32 of gripping portion 24 to the body portion 12 during installation of the cap 10. Resultantly, over torquing of the cap 10 into the threaded inlet 18 is prevented. In this regard, an annular rubber seal member 52 is located between the upper end surface 54 of inlet 12 and a seal seating surface 56 of the body portion 12. The limiting of torque in installing the cap 10 is to protect the seal from damage and to make subsequent removal of the cap 10 relatively easy without defeating the sealing function.

As previously mentioned and as best illustrated in FIG. 8, the three flexible arms 42 extend from thin support posts 44. The upper ends of the posts 44 are also connected to the annular edge formation 30. Further, an additional three posts 58 are provided to connect the lower main body portion 12 with the annular edge formation 30. Resultantly, only the three posts 44 with arms 42 and the three posts 58 without arms connect edge formation 30 to the tubular body portion 12 which threads into the filler inlet 18.

If the vehicle is involved in an accident causing body damage near the inlet, it is important that the filler inlet remain covered and the fuel tank continues to be sealed from atmosphere. Thus, if damage occurs, it is desired that at least the portion of the body 12 including the partition wall and more inward portions remain in the filler inlet 18. It is not undesirable if the exposed gripping portion 24 and a portion of the body 12 outwardly from the partition wall is removed from the remainder.

A likely impact or force on the cap assembly can occur when portions 60 of the vehicle body adjacent the cap shift laterally relative to the filler inlet and cap. Typically, the vehicle body 60 includes an outer metal panel 64 and an inwardly directed part 62 of the body panel. This body structure 60 may be shifted laterally or radially with respect to the cap and filler inlet in the direction 66. Thus, a force on the gripping portion 24 of the cap 10 in the direction of arrow 66 is generated.

When the above described force is exerted on the cap assembly 10, considerable stress is applied to the upper portion of the assembly. Without the specific desired structure of the cap assembly as in this application, this force could cause a large portion of the cap to be removed from the inlet 18. If a portion of the body 12 including any of the partition wall 22 is removed, the interior of the fuel tank will be open to atmosphere which is not desired. However, the support posts 44 and 58 are provided so that a significant force will cause the posts to separate from the body portion and allow the gripping portion 24 to move with any shifting vehicle body panel. Resultantly, the partition wall 22 and lower portion of body 12 will remain in the inset 18.

Although only one basic embodiment of the improved fuel filler inlet cap has been described and illustrated, it is obvious that there can be modifications to the cap and associated structure which would still fall within the scope of the invention as defined by the following claims.

What is claimed is as follows:

1. For a vehicle fuel tank having an inletting device, an improved impact reactive cap to cover the inlet, comprising: a cap having a main body portion adapted to be removably installed in the inletting device; a gripping portion of the cap located outwardly from the inletting device to permit application of installation and removal forces on the body portion relative to the inletting device; interconnecting structure attaching the body portion to the gripping portion including thin posts sufficiently strong to transmit the installation and removal forces, the posts extending axially between the body portion and the gripping portion whereby axially directed impact forces on the gripping portion severs the posts and thus separates the gripping portion from the body portion and whereby laterally directed forces o the gripping portion exerts a bending action on the posts to sever the posts and thus separate the portions, leaving the body portion within the inletting device.

2. For a vehicle fuel tank with a tubular inlet for introducing fuel to the tank including a threaded inside opening, an improved impact reactive cap to cover the inlet and plug the inside opening, comprising: a removable cap including a main body portion with thread means formed thereon adapted to selectively enter or exit the inlet by rotation of the cap, the body portion sealing the fuel tank from atmosphere when in the inlet; an exterior gripping portion of the cap located outwardly from the inlet to permit a user to rotate the body portion relative to the inlet for installing and removing the cap from the inlet; interconnecting structure attaching the body portion to the gripping portion including several thin post-like connectors which together are sufficiently strong to transmit torque for normal removal and installation of the cap; the post-like structure extending in a substantially axial direction between the body portion and the gripping portion whereby axially directed impact forces on the gripping portion buckles the thin post-like structure causing the gripping portion to separate from the body portion which remains intact in the inlet and whereby laterally directed impact forces on the gripping portion bends the post-like structure causing the gripping portion to separate from the body portion which remains intact in the inlet.

3. The improved cap set forth in claim 2 in which the interconnecting structure includes has an annularly shaped part attached to the body portion by the post-like structures, the gripping portion has a recess to receive the annularly shaped end part; means formed on the gripping portion in the recess to axially secure the annular end part to the gripping portion while allowing relative motion between the body and gripping portions; torque transmitting means between the body and gripping portions to rotationally connect the portions so that rotation of the gripping portion causes corresponding rotation of the body portion.

4. The improved cap set forth in claim 3 in which the torque transmitting means includes an arm member extending in a circumferential direction from a post-like structure and a toothed cylindrical part of the gripping portion located adjacent the free end of the arm member whereby as the gripping portion is rotated during removal or installation of the cap, a tooth engages the end of the arm member to transmit the rotative force resulting in corresponding rotation of the body portion.

5. The improved cap as set forth in claim 4 in which each of the teeth of the gripping portion is defined by a first surface and an opposite second surface; the end portion of the arm is engaged by the first surface when the gripping portion is rotated to remove the body portion from the inlet and is engaged by the second surface when the gripping portion is rotated to install the body portion in the inlet; the first surface of the tooth extends nearly radially whereby the end of the arm is positively engaged so that a large rotation torque can be transmitted as the gripping portion is rotated to remove the cap; the second surface of the tooth is inclined to the radial direction so that an excessively large rotation torque applied to the gripping portion in the direction to install the cap causes the end portion of the arm to flex away from the tooth and skip to the next tooth, thus limiting the application of installing torque.

6. The improved cap set forth in claim 5 in which the end of the arm member is configured with a flat surface in a nearly radial plane to correspond to the first surface of the tooth; the arm end also being configured with an inclined non-radial surface adapted to engage the second surface of the tooth whereby the natural resilience of the arm member engages the inclined surfaces when the gripping portion is rotated to install the cap in the inlet.

* * * * *